US012037810B2

(12) United States Patent
Linnåsen

(10) Patent No.: US 12,037,810 B2
(45) Date of Patent: Jul. 16, 2024

(54) SWING HANDLE ARRANGEMENT WITH FIRST AND SECOND LOCKING MECHANISMS

(71) Applicant: Industrilås i Nässjö Aktiebolag, Nässjö (SE)

(72) Inventor: Adam Linnåsen, Nässjö (SE)

(73) Assignee: Industrilås i Nässjö Aktiebolag, Nässjö (SE)

( * ) Notice: Subject to any disclaimer, the term of this patent is extended or adjusted under 35 U.S.C. 154(b) by 597 days.

(21) Appl. No.: 17/279,613

(22) PCT Filed: Aug. 22, 2019

(86) PCT No.: PCT/EP2019/072492
§ 371 (c)(1),
(2) Date: Mar. 25, 2021

(87) PCT Pub. No.: WO2020/064233
PCT Pub. Date: Apr. 2, 2020

(65) Prior Publication Data

US 2022/0034121 A1 Feb. 3, 2022

(30) Foreign Application Priority Data

Sep. 25, 2018 (EP) .................................... 18196415

(51) Int. Cl.
*E05B 1/00* (2006.01)
*E05B 13/00* (2006.01)
(Continued)

(52) U.S. Cl.
CPC .......... *E05B 1/0092* (2013.01); *E05B 13/004* (2013.01); *E05B 47/0669* (2013.01); *E05C 3/162* (2013.01)

(58) Field of Classification Search
CPC .......... E05B 1/003; E05B 1/0092; E05B 5/00; E05B 5/003; E05B 13/00; E05B 13/002;
(Continued)

(56) References Cited

U.S. PATENT DOCUMENTS 4,134,281 A * 1/1979 Pelcin ..................... E05B 13/10
292/DIG. 31
4,510,779 A * 4/1985 Ahad ........................ E05B 5/00
292/DIG. 31
(Continued)

FOREIGN PATENT DOCUMENTS

DE 29722000 U1 4/1999
EP 0261266 A1 3/1988

OTHER PUBLICATIONS

PCT International Search Report and Written Opinion for corresponding PCT International Application No. PCT/EP2019/072492.
(Continued)

*Primary Examiner* — Christine M Mills
*Assistant Examiner* — Yahya Sidky
(74) *Attorney, Agent, or Firm* — Olive Law Group, PLLC

(57) ABSTRACT

Handle arrangement for arrangement to a door provided with a door latch, the handle arrangement comprising a housing having a hollow interior, and handle moveable relative to the housing along a first direction, the handle configured to couple to the door latch, wherein a movement of the handle along said first direction moves the door latch to or from the latching position; wherein the handle is moveable relative the housing along a second direction, between a secured position, in which position the handle is locked to the housing, and a released position, in which position the handle is moveable relative the housing about the first direction; a first locking mechanism configured to, in a locking state, lock the handle in the secured position,
(Continued)

and in a releasing state, allow the handle to be moved to the released position, and a second locking mechanism.

15 Claims, 7 Drawing Sheets

(51) Int. Cl.
*E05B 47/06* (2006.01)
*E05C 3/16* (2006.01)

(58) Field of Classification Search
CPC ...... E05B 13/004; E05B 13/10; E05B 13/106; E05B 47/0657; E05B 47/0665; E05B 47/0669; E05B 7/00; E05B 17/22; Y10T 292/57; Y10T 292/96; Y10S 292/31
See application file for complete search history.

(56) References Cited

U.S. PATENT DOCUMENTS

| | | | | | |
|---|---|---|---|---|---|
| 4,930,325 | A | | 6/1990 | Ramsauer | |
| 5,338,236 | A | * | 8/1994 | Dunham | B63H 20/32<br>440/77 |
| 5,469,725 | A | * | 11/1995 | Yamada | E05B 13/10<br>292/DIG. 31 |
| 2017/0241161 | A1 | * | 8/2017 | Fink | E05B 1/0053 |
| 2017/0350161 | A1 | * | 12/2017 | Fink | E05C 3/16 |
| 2018/0347243 | A1 | * | 12/2018 | Ryan | E05B 83/44 |

OTHER PUBLICATIONS

Office Action dated Apr. 1, 2022 from associated Indian patent application No. 202127005897 (6 pages).

* cited by examiner

SWING HANDLE ARRANGEMENT WITH FIRST AND SECOND LOCKING MECHANISMS

CROSS REFERENCE TO RELATED APPLICATIONS

This application is a 35 USC 371 application of International PCT Patent Application No. PCT/EP2019/072492, filed on Aug. 22, 2019, which claims priority to European Patent Application No. 18196415.6, filed on Sep. 25, 2018; the contents of which are hereby incorporated by reference herein in their entireties.

TECHNICAL FIELD

The present disclosure relates to a handle arrangement and more specifically to a compact swing handle arrangement with two locking mechanisms.

BACKGROUND

There is a wide range of handle arrangements for facilitating opening of doors. A known type is the lift handle arrangement, see for instance EP0261266. Common among this type of lift handle arrangements is that they comprise a handle pivotably coupled to a connecting element, thereby allowing the handle to rotate about a first axis relative the connecting element. In turn, the connecting element is rotatable relative the handle housing about a second axis. The handle can move between an active state, in which state the handle is free to rotate relative the housing about the first axis, and an inactive state, in which state the handle is unable to rotate relative the housing about the first axis.

When installing the lift handle arrangement to an openable door, the connecting element is coupled to a latch in the door configured to secure said door in a closed position. By rotating the handle, and consequently the connecting element, said latch is moved between a latching position, in which the door is securely closed, and an unlatched position, in which said door is openable.

Furthermore, it is preferable to equip the lift handle arrangement with a locking mechanism for securing the handle to the housing when in an inactive state. Also, some lift handle arrangements are also equipped with a locking mechanism for preventing the latch to move from a latching position. Since the space within a handle housing is very limited, it is cumbersome, to fit two separate locking mechanism that are sturdy and able to withstand great forces.

Hence, there is a need for a new lift handle arrangement with a locking mechanism that makes efficient use of the space available within a handle housing, which locking mechanisms are sturdy and able to withstand great forces.

SUMMARY OF THE PRESENT DISCLOSURE

It is an object of the present disclosure to provide an improved solution that alleviates the mentioned drawbacks with present solutions. Furthermore, it is an object to provide an improved solution for locking a door to a door frame, wherein the solution is compact and sufficiently secure. The invention is defined by the appended independent claims, with embodiments being set forth in the appended dependent claims, in the following description and in the drawings.

According to a first aspect of the invention, a handle arrangement for arrangement to a door provided with a door latch which in a latching position engages with the door frame to prevent the door from being opened, is provided. The handle arrangement comprises a housing having a hollow interior; a handle moveable relative to the housing along a first direction, the handle configured to couple, when the handle arrangement is in use, to the door latch, wherein a movement of the handle along said first direction moves the door latch to or from the latching position; wherein the handle is moveable relative the housing along a second direction, between a secured position, in which position the handle is locked to the housing, and a released position, in which position the handle is moveable relative the housing about the first direction. The handle arrangement further comprises a first locking mechanism configured to, in a locking state, lock the handle in the secured position, and in a releasing state, allow the handle to be moved to the released position. The handle arrangement further comprises a second locking mechanism configured to, in a locking state, prevent movement of the handle, and thereby also the door latch when in use, along the first direction, and in a releasing state allow movement of the handle along the first direction to, when in use, move the door latch to and from the latching position; and an actuating device configured to actuate the first locking mechanism into a locking state or a releasing state, wherein the actuating device is further configured to actuate the second locking mechanism into a locking state or a releasing state.

In the context of the actuating device, "to actuate" is to be interpreted as the ability to drive a movement of an affected locking mechanism between the locking state and releasing state via a movement of the actuating device or a component thereof. Further, the actuation of the affected locking mechanism may further only correspond to a portion of the motion associated to the actuating device.

Also, the handle is moveable relative the housing between the released position and a closed position, which closed position is defined as the position in which the handle is without further movement securable to the housing via the first locking mechanism, but not yet secured.

The first locking mechanism may be arranged in the hollow interior of the housing. The second locking mechanism may be arranged in the hollow interior of the housing. The actuating device may be arranged in the hollow interior. The first locking mechanism, the second locking mechanism, and the actuating device may all be mutually arranged in the hollow interior of the housing, such that the actuating device is capable of actuating both the first and the second locking mechanism. A first advantage of the handle arrangement is that both the first locking mechanism and the second locking mechanism are actuated by a single actuating device. This removes the necessity of actuating the first and second locking mechanism with separate actuating devices. A second advantage is that the housing may be designed with a smaller form factor. A smaller form factor is preferable, as it allows the handle arrangement to be suitable for a greater variety of doors.

In one embodiment, the handle may be rotatable about a first rotational axis, wherein said first direction is a rotational direction about said first rotational axis. The handle may be configured such that a rotation of the handle about the first rotational axis, when in use, actuates movement of the door latch. An advantage with such arrangement may be that the housing of the handle arrangement can be more compactly designed.

In one embodiment, the handle may be rotatable about a second rotational axis, wherein said second direction is a rotational direction about said second rotational axis. The handle may be configured to be rotatable between the released position and the secured position. An advantage of such arrangement may be that the housing of the handle arrangement can be more compactly designed.

In one embodiment, the handle may be rotatably coupled to a coupling element to rotate about the second rotational axis, which coupling element may be rotatably arranged to the housing to rotate about the first rotational axis. The coupling element may be arranged to substantially reside rotatably in the housing. This may allow the handle to be placed closer to the housing when in a closed position. The housing may be designed to substantially enclose the handle when being in a closed position. This may prevent tinkering of the handle.

In one embodiment, the handle arrangement may be configured such that the first rotational axis and the second rotational axis are substantially perpendicular to each other.

In one embodiment, the first locking mechanism may comprise a handle latch moveable relative to the housing between a latching position, in which position the handle latch engages with a latch receiving element of the handle so as to lock the handle in its secured position, and an unlatched position, in which position the handle latch is released from the handle, wherein movement of the handle latch is actuated by the actuating device. As the handle is moved to the secured position, the handle latch receiving element may be placed such that it is engageable with the handle latch. The actuating device may then actuate the first locking mechanism such that the handle latch is moved to engage with the handle latch receiving element. When the handle latch is in a locking position and engages with the handle latch receiving element, the handle may be prevented from being rotated away from the secured position. An advantage of the handle latch may be a convenient and reliable way of securing the handle to the housing. Further, the handle latch and the handle latch receiving element of the handle may be mutually designed to interlock one another. As an example, one of the handle latch and the handle latch receiving element may be substantially hook-shaped so that said one of the handle latch and the handle latch receiving element hooks into the other of the handle latch and the handle latch receiving element.

In one embodiment, the handle latch may comprise a base portion moveably coupled to the housing, and a latching portion extending out from the base portion, such that a gap is formed in between the base portion, and the latching portion, wherein the latch receiving element of the handle is configured to be positioned in said gap when the handle is moved to its secured position. The handle latch may be substantially hook shaped. The handle latch receiving element may have a corresponding shaped, arranged to be latched-onto by the handle latch. The handle latch receiving element may be a pin arranged to longitudinally extend in a direction parallel to the second rotational axis. When the handle is moved to the secured position, the handle latch may be moved to the locked position to engage with the pin. An advantage of this embodiment of the handle latch is a more convenient form factor for securing the handle to the housing.

In one embodiment, the first locking mechanism may comprise a spring configured to bias the handle latch toward the latching position. The spring may have a plurality of spring turns. The spring may be made of a resilient material. The spring may have a suitable stiffness characteristic for biasing the handle latch toward the latching position. The spring may be arranged such that a first longitudinal end of the spring abuts a surface of the housing, and wherein a second longitudinal end of the spring abuts the handle latch. The spring may be configured to become biased whenever the handle latch is displaced from its locking position. An advantage of the spring is that the handle arrangement may become automatically locked when the handle is placed in its secured position. This takes away the burden for a user to remember to actuate locking of the first locking mechanism to lock the handle securely to the housing.

In one embodiment, a surface of the handle latch facing the handle may be inclined relative the direction in which the handle moves when moved toward the secured position. Alternatively, the handle latch receiving element facing the handle latch when the handle is moved to the secured position may be inclined relative a plane parallel to the back side of the handle instead. Optionally, both the handle latch and the handle latch receiving element may have inclined surfaces as previously described. This inclined surface allows for the handle to displace the handle latch, when in a latching position, slightly, as the handle is moved to its secured position, such that the handle may fully enter a secured position.

In one embodiment, the handle latch may comprise a ridge configured to abut a stopping edge of the housing whenever the handle latch is in the latching position. The ridge may extend out from the handle latch. The ridge may extend out from the base portion of the handle latch. The ridge may have a substantially elongated form extending along the body of the handle latch. The ridge may provide a more suitable body for facilitating actuation of the first actuating device. The ridge may also provide means for limiting the movement of the handle latch. The ridge may be configured to make contact with the stopping edge of the housing when the handle latch is moved to its latching position, thereby preventing the handle latch to move beyond this position along this direction. The ridge may be configured to make contact with the stopping edge of the housing when the handle latch is moved away from its latching position, thereby preventing the handle latch to move too far away from its locking position. Further, the ridge may be configured to make contact with some other element residing in-between the ridge and the housing, for instance friction-reducing means or pressure absorbing padding. The ridge and the stopping edge may hence limit the range of motion of the handle latch. This may prevent the handle latch to enter a position in which it is not readily able to engage with the handle latch receiving element of the handle, possibly damaging the handle latch or the first latching mechanism as a whole.

In one embodiment, the handle latch is configured to move rotatably relative the housing between the latching position and the unlatched position. The handle latch may be rotationally coupled to the housing. The handle latch may be configured to rotate relative the housing about a second rotational axis. The stopping edges of the housing which may limit the handle latch when moving either away from or beyond the latching position may be the same stopping edge. By having a rotatable handle latch, the housing will require less space to allow the full range of movement of the handle latch. Hence, the handle latch may be moved between the latching position and the unlatched position in a relatively small space as compared to a case wherein the handle latch is configured to move linearly between the latching position and the unlatched position. This allows for the housing to have an even more compact form factor.

Alternatively, the handle latch is configured to be linearly moveable relative the housing between the latching position and the unlatched position. By having this design, the housing may have a flatter design which may be preferable in some situations. Optionally, the handle latch may combine both linear and rotational movement when moved between the latching position and the unlatched position.

In one embodiment, the ridge of the handle latch extends further along the axis of rotation of the handle latch than a base portion of the handle latch. This may improve access of the ridge to the actuating device. The actuating device may actuate the first locking mechanism by pressing onto the portion of the ridge extending beyond the longitudinal extension of the base portion of the handle latch.

In one embodiment, the housing may be provided with a housing recess configured to receive the handle when placed in a secured position. By having said recess, the housing may prevent the handle from being gripped when the handle is placed in said recess. This hinders unauthorized access, making it more difficult to open when the handle is in a secured position. The handle may comprise a handle spring arranged so that one longitudinal end abuts the housing and a second longitudinal end abuts the handle. The spring may become biased when the handle is placed in the secured position. When the first locking mechanism is actuated into a releasing state, such that the handle is unsecured from the housing, the handle may be automatically pushed away from the housing via the handle spring.

In one embodiment, the handle may comprise a heel configured to abut a stopping portion in the housing recess if the handle is moved too deeply into the housing recess. The heel may be arranged to a back side of the handle. The heel may extend in a substantially perpendicular direction relative the longitudinal direction of extension of the handle. The distance the handle can be moved into the housing recess may be predetermined by the combined height of the heel and the stopping portion, the height being the extension of the heel and the stopping portion combined along the direction of depth of the housing recess.

In one embodiment, the actuating device may comprise an actuating member rotatably arranged to the housing to rotate about a rotational axis, the actuating member configured to rotatably engage with at least one of the first and second locking mechanisms to actuate said at least one of the first and second locking mechanisms into a locking state or a releasing state. The actuating device may be configured to rotatably engage with only with one of the first and second locking mechanism via the actuating member. The actuating device may be configured to rotatably engage with both of the first and second locking mechanism via the actuating member. The actuating device may be configured to rotatably engage with both the first and second locking mechanism, but via two separate actuating members, a first actuating member and a second actuating member, each actuating member rotatably arranged to the housing to rotatably actuate the first and second locking mechanisms, respectively. The actuating members may be arranged rotatably to the housing such that their respective rotational axis are mutually perpendicular. The actuating members may be arranged rotatably to the housing such that their respective rotational axis are parallel. The actuating members may be arranged rotatably to the housing such that their respective rotational axis are coaxial. By having a rotatable actuating member, the housing may be made more compact. The actuating members may be two members both arranged on a common rotating shaft. The actuating members may in such case be arranged with an axial distance between each other.

In one embodiment, the actuating member may comprise an actuating portion extending radially from the rotational axis of the actuating member, wherein the actuating portion is configured to actuate the first locking mechanism. The actuating portion facilitates transferring an angular momentum of the actuating member to the first locking mechanism. The actuating portion may be configured to be rotated into contact with the ridge of the handle latch. The actuating portion and the ridge of the handle latch may mutually facilitate transferring an angular momentum of the actuating member to the handle latch. The actuating portion may be provided with a flat surface, which surface is configured to glide relative the ridge of the handle latch when said handle latch has rotated into the unlatched position. This allows for the actuating member to only have to rotate in a single rotational direction to actuate the first locking mechanism. The actuating member, after having actuated the first locking mechanism once into the released state, may then rotate a full revolution to actuate the first locking mechanism once more.

In one embodiment, the actuating member may comprise a set of two actuating portions arranged on opposing sides about the rotational axis of the actuating member. This allows for the actuating member to actuate the first locking mechanism twice for each revolution.

In one embodiment, said actuating portion is a first actuating portion and the actuating member further may comprise a second actuating portion arranged on the actuating member. The second actuating portion may be configured to rotatably actuate the second locking mechanism into the locking state or the releasing state. The first actuating portion and the second actuating portion may be rotationally uncoupled to each other, so that the first and second locking mechanisms may be actuated independently from one another. The first and second actuating portions may alternatively be rotationally coupled to each other. The actuating member may comprise a shaft which couples the first and second actuating portions to each other. By such arrangement, both the first and the second locking mechanisms may be actuated by the actuating member and the rotation thereof. The second actuating portion may be arranged with an axial distance to the first actuating portion along the actuating member's extension along axis D. The second actuating portion may be moved 90 degrees to be moved from a position in which the second locking mechanism is in a locked state to a position in which the second locking mechanism is in an open state. Alternatively, such movement may be 180 degrees. The second actuating portion may, in a locking state, prevent the second locking mechanism from being opened and thereby the handle from being rotated around axis A. In one embodiment, the second actuating portion may comprise a set of two actuating portions arranged on opposing sides about the rotational axis of the actuating member.

In one embodiment, the actuating device comprises an electric motor coupled to the actuating member. The electric motor may be coupled to one end of the actuating member. The electric motor may be supplied with power, either by a battery, or by external power means.

In one embodiment, the handle arrangement may comprise a control panel communicatively connected to the electric motor, which control panel may be configured to control the electric motor. The control panel may comprise a user interface configured to receive commands of a user for operating the actuating device to actuate either the first or second locking mechanisms, or both. The control panel may comprise a plurality of buttons. The control panel may be configured to send an operative signal to the actuating device to actuate any or both of the first and second locking mechanism if a specific order of the plurality of buttons are pressed.

In one embodiment, the first locking mechanism may be arranged to the housing such that the third rotational axis and the first rotational axis are substantially perpendicular to each other.

In one embodiment, the actuating device may be configured to actuate the first and second locking mechanisms simultaneously. The actuating device may rotate the actuating member when actuating the locking mechanisms. The same rotational movement of the actuating member may thereby actuate both locking mechanisms at the same time. Such arrangement may provide an effective enablement of the handle to open the door latch. At the same time as the second locking mechanism is moved to the releasing state, enabling movement of the door latch, the first locking mechanism may be moved to the releasing state, such that movement of the handle in the first direction is enabled.

In one embodiment, the handle arrangement may comprise a display unit configured to indicate whether the first locking mechanism of the handle arrangement is in a locked or unlocked state. The handle arrangement may comprise a display unit configured to indicate whether the second locking mechanism is in a locked or unlocked state. The handle arrangement may comprise a display unit configured to indicate whether both the first and second locking mechanism of the handle arrangement are in locked or unlocked states, respectively. The display unit may be configured to indicate a two-step locking/unlocking of the handle arrangement, wherein the two steps indicate a locking or an unlocking of the first locking mechanism and an unlocking of the second locking mechanism. The display unit may be configured to simply indicate whether a door to which the handle arrangement is arranged to is openable or locked based on the locking states of the first and second locking mechanisms.

The display unit may be a segment display. The segment display may be a seven-segment display. The segment display may be a nine-segment display. The segment display may be a fourteen-segment display. The segment display may be a sixteen-segment display. The display unit may be a liquid-crystal display. The display unit may be a light-emitting-diode display. The display unit may be configured to display text indicating whether a handle arrangement is locked or unlocked. The text indicating whether a handle arrangement is locked or unlocked may incorporate the words “OPEN”, “CLOSED”, “LOCKED”, “UNLOCKED”, or synonyms thereof. The display unit may be configured to display different colors indicating whether a handle arrangement is locked or unlocked. The colors for indicating whether a handle arrangement is locked or unlocked may be RED and GREEN, respectively.

Further, the handle arrangement may comprise means for determining the locking/unlocking state of the first and/or the second locking mechanisms. Said means for determining the locking/unlocking state of the first and/or the second locking mechanisms may comprise a locking/unlocking state detector which is configured to detect the locking/unlocking state of the first and/or the second locking mechanisms. The locking/unlocking state detector may comprise a distance measurement device configured to measure a distance to a moveable part of a locking mechanism. The electronics of the handle arrangement may be configured to be able to determine a deviation of the measured distance to the moveable part of a locking mechanism. The electronics of the handle arrangement may be programmed to base an indication indicating whether a handle arrangement is locked or unlocked on whether a deviation of a measured distance to the moveable part of a locking mechanism exceeds a threshold value. The threshold value may correspond to an expected change of distance due to the change of a locking mechanism between a locked state and an unlocked state.

BRIEF DESCRIPTION OF THE DRAWINGS

The invention will in the following be described in more detail with reference to the enclosed drawings, wherein.

DESCRIPTION OF EMBODIMENTS

Figure 1A:
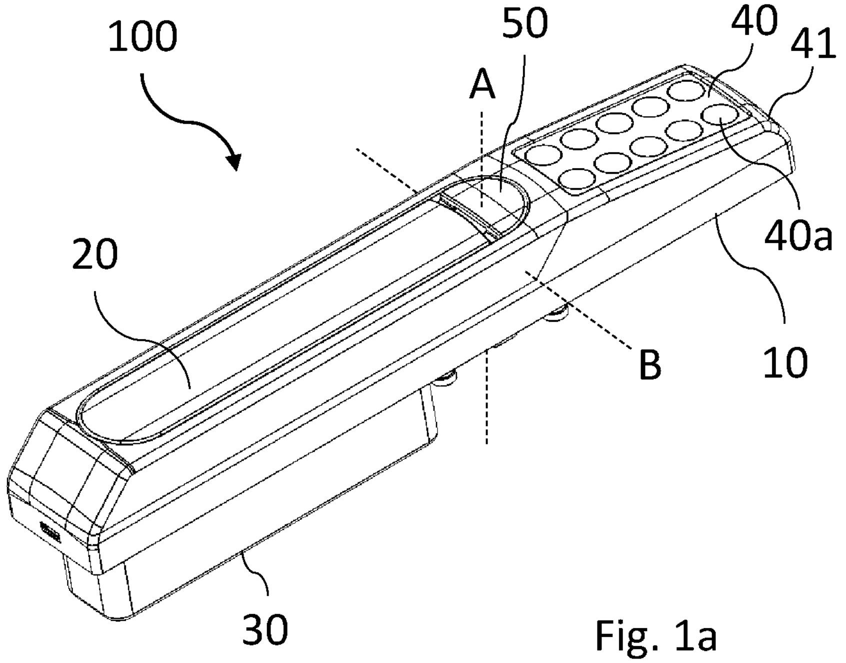
FIGS. 1*a*-*b* are perspective views of a handle arrangement according to one embodiment of the present invention.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements. In the drawings and specification, there have been disclosed preferred embodiments and examples of the invention and, although specific terms are employed, they are used in a generic and descriptive sense only and not for the purpose of limitation, the scope of the invention being set forth in the following claims.

In the following, with references to figures, a handle arrangement 100 for arrangement to a door 200 openable relative a door frame 210 is described. The handle arrangement 100 comprises a housing 10 having a hollow interior, and a handle 20 rotatable relative to the housing 10 about a first rotational axis A. The handle 20 is configured to be coupled to a door latch 240 which, in a latching position, engages with the door frame 210 to prevent the door 200 from being opened, and wherein a rotation of the handle 20 about said first rotational axis A moves the door latch 240 to or from the latching position. Furthermore, the handle 20 is rotatable relative the housing 10 about a second rotational axis B, between a secured position in which the handle 20 is locked to the housing 10, and a released position in which the handle 20 is rotatable relative to the housing 10. When released, the handle 20 is rotatable relative the housing 10 about both the first and the second rotational axis. The handle arrangement 100 further comprises a first locking mechanism 60 configured to, in a locking state, lock the handle 20 in the secured position, and in a releasing state, allow the handle to be moved to the released position. The handle arrangement 100 further comprises a second locking mechanism 80 configured to, in a locking state, prevent movement of the door latch 240 from the latching position, and in a releasing state allow movement of the door latch from the latching position. Furthermore, the handle arrangement 100 comprises an actuating device 70 configured to actuate the first locking mechanism 60 to a releasing state, wherein the actuating device 70 is further configured to actuate the second locking mechanism 80 into a locking state or a releasing state.

Figure 1B:
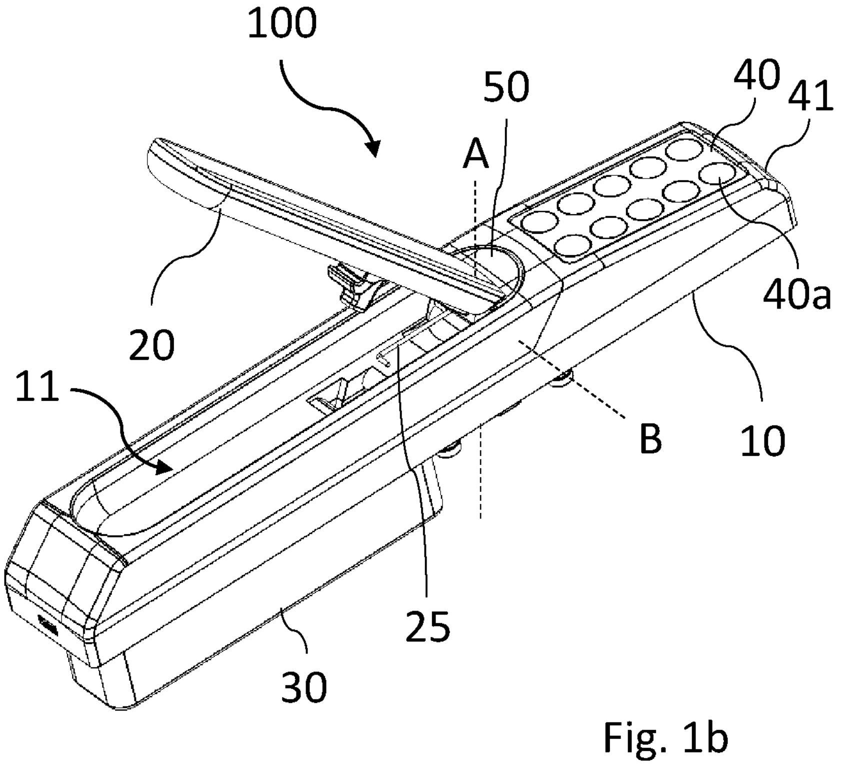

The handle arrangement 100 according to one embodiment is now described in further detail with reference to the figures. In FIG. 1*a*, the handle arrangement 100 according to one embodiment is illustrated as seen as when the handle 20 is in a released position. In FIG. 1*b*, the handle arrangement 100 illustrated in FIG. 1*a* is illustrated as seen when the handle 20 is in a released position. The handle arrangement 100 comprises a coupling element 50 rotatably arranged to the housing and configured to rotate relative the housing 10 about the first rotational axis A. The handle 20 is rotatably arranged to the coupling element 50 and configured to rotate relative the coupling element 50 about the second rotational axis B, between a secured position, in which position the handle 20 is positioned in a housing recess 11 of the housing 10 and is secured to the housing 10, and a released position, in which position the handle 20 has been moved out of the housing recess 11 and is rotatable relative the housing 10 via the coupling element 50 about the first rotational axis A.

In one embodiment, the housing 10 is provided with a control panel 40. The control panel 40 is arranged on the front side of the housing 10. The control panel 40 is communicatively connected to the actuating device 70. The control panel 40 is configured to control the actuating device 70. The control panel 40 comprises a plurality of buttons 40*a*. These buttons are configured to be pressed by a user for controlling the actuating device 70. The handle arrangement 100 further comprises an electronic circuit arranged in the interior of the housing 10. The electronic circuit is configured to relay control signals from the control panel 40 to the actuating device 70. The handle arrangement 100 comprises at least one battery 90. The battery 90 is arranged in a utility container 30 arranged on the back side of the housing 10. The battery 90 is electronically connected to at least one electronic component of the handle arrangement 100. The battery 90 is configured to supply power to the electronic components of the handle arrangement 100.

In one embodiment, the housing 10 is provided with a display unit 41. The display unit 41 is arranged on a top side of the housing 10 as indicated in FIGS. 1*a*, 1*b*, 2*a*, 2*b*. The display unit 41 is communicatively connected to the actuating device 70. The display unit 41 is configured to indicate whether a door 200 to which the handle arrangement 100 is arranged to is openable or locked. The display unit 41 is configured to indicate whether the door 200 is openable or locked by color, preferably GREEN and RED to indicate that the door 200 is openable and locked, respectively. Alternatively, the display unit 41 is configured to indicate whether the door is openable or locked by text. The text indicating whether a handle arrangement is locked or unlocked may incorporate the words "OPEN", "CLOSED", "LOCKED", "UNLOCKED", or synonyms thereof.

Figure 2A:
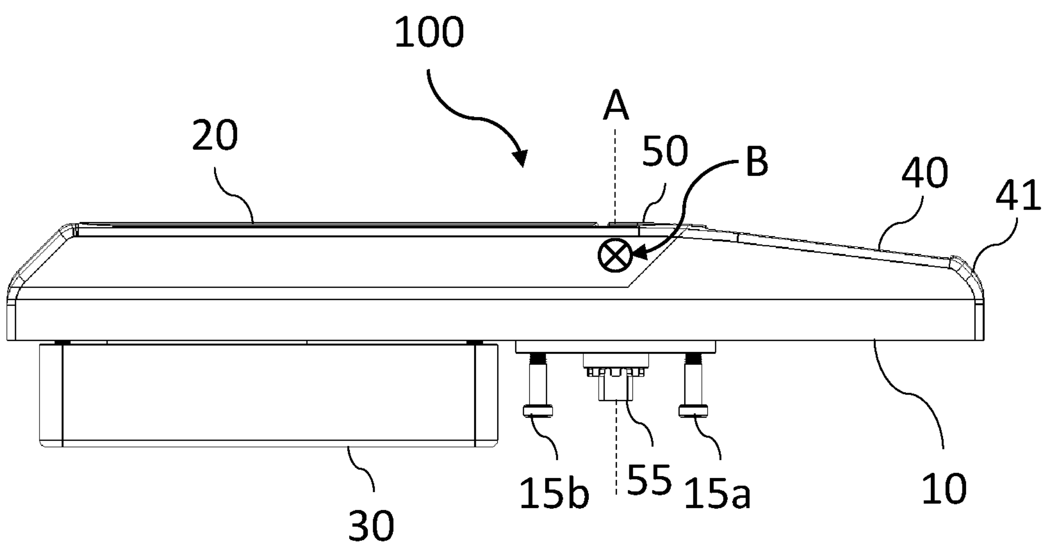
FIGS. 2*a*-2*b* are side views of a handle arrangement according to one embodiment of the present invention.
Figure 2B:
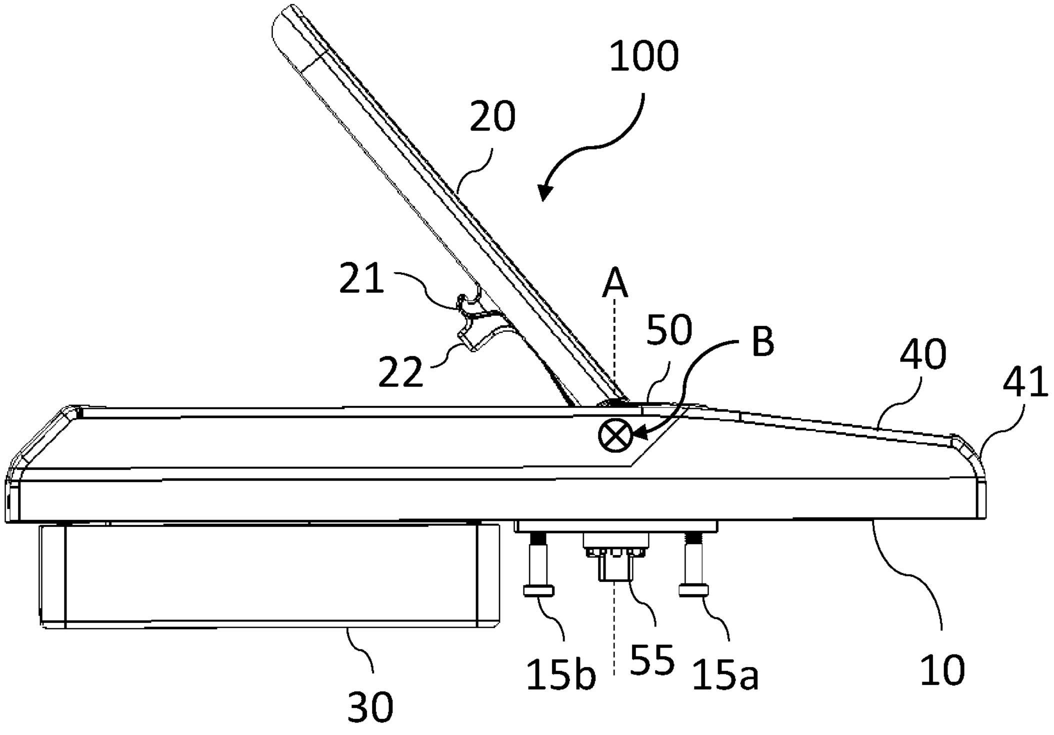

In FIGS. 2*a*, 2*b*, the handle arrangement 100 illustrated in FIG. 1*a* is illustrated as seen from the side, when the handle 20 is in a secured position and in a released position, respectively. The coupling element 50 is arranged to the housing 10 such that a coupling portion 55 protrudes through the back side of the housing 10, which side is intended to face a door 200 when the handle arrangement 100 is arranged thereto. The coupling element 50 and the coupling portion 55 are coupled to each other, such that when the coupling element 50 is rotated about the second rotational axis B, the coupling portion 55 rotates about the second rotational axis B by the same angle.

Further, the handle arrangement 100 is configured to be arranged securely to an openable door, window, or similar. The handle arrangement 100 may be securely arranged to said openable door, window, or similar using fastening means 15*a*, 15*b*. These fastening means 15*a*, 15*b* may be threaded screws, as shown in FIGS. 1*a*-2*b*, and FIG. 4.

Further, one embodiment of the handle arrangement 100 comprises a handle latch receiving element 21 arranged on the handle 20 and a stopping element 22. These will be described in more detail later on, in reference to FIG. 4.

Figure 3A:
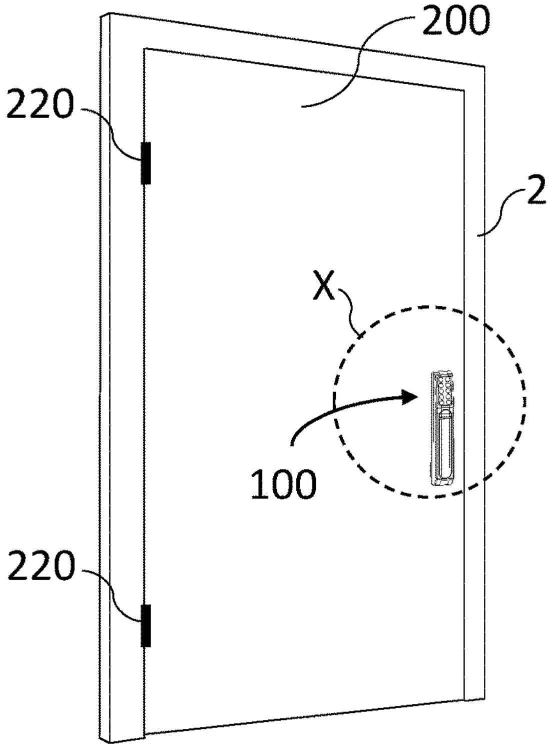
FIG. 3*a*-3*d* are perspective views of a handle arrangement according to one embodiment of the present invention.
Figure 3B:
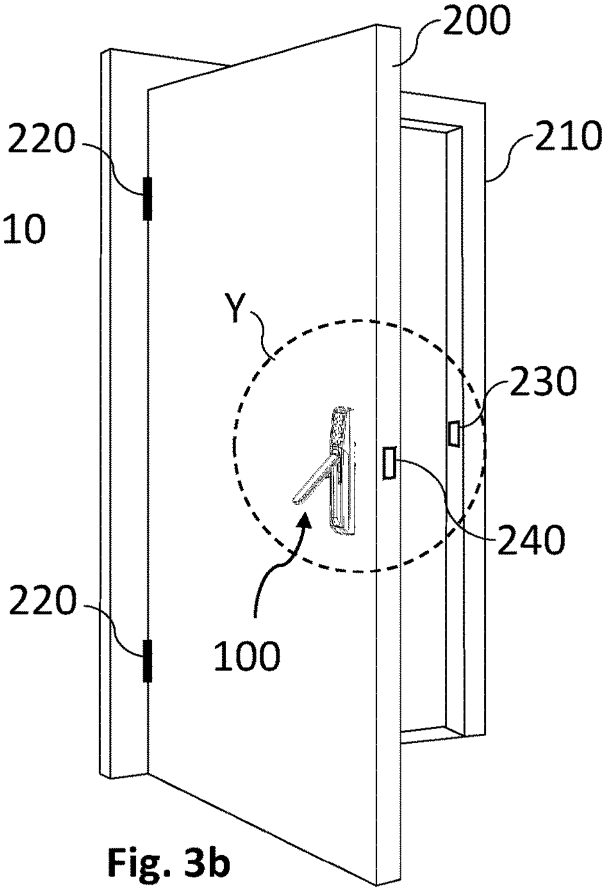
Figure 3C:
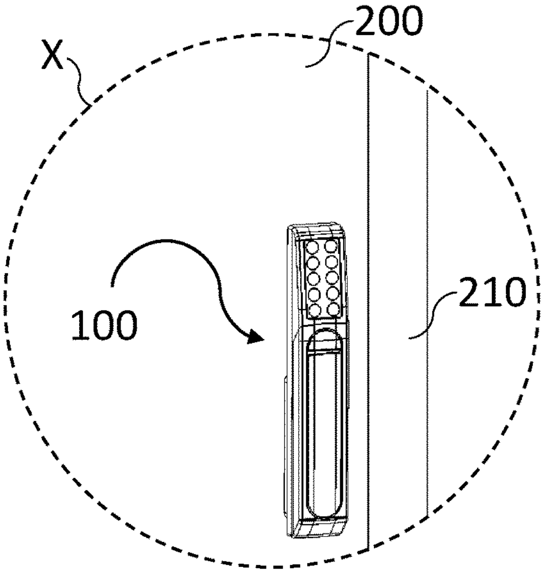
Figure 3D:
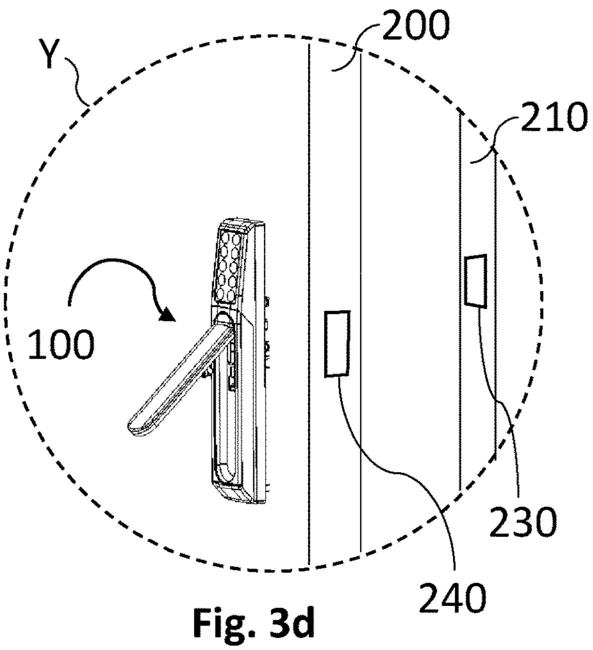

In FIGS. 3*a*-3*d*, the handle arrangement 100 is shown arranged to a door 200, wherein said door 200 is in a closed position and in an open position relative a door frame 210, respectively. FIGS. 3*a*, 3*c*, show the handle arrangement 100 arranged on a closed door, while FIGS. 3*b*, 3*d*, show the handle arrangement 100 arranged on an open door. Specifically, FIGS. 3*c*, 3*d* illustrate the regions marked by X and Y in FIGS. 3*a*, 3*b*, respectively. The coupling portion 55 is configured to couple to a door latch 240 of a door 200, which door latch 240 is moveable relative the door 200 between a latching position, in which position the door latch 240 prevents a closed door from being opened, and an unlatched position, in which position a door 200 is moveable relative a door frame 210. The door latch 240 is moveable between the latching position, in which it engages with a latch receiving element 230, and the unlatched position by rotating the coupling element 50 relative the housing 10 about the first rotational axis A. By releasing the handle 20 from the housing 10, and having it moved to the released position, the handle 20 can be further rotated about the first rotational axis A to move the door latch 240 to an unlatched position. Then, the door 200 can be rotatably opened, which door 200 is rotatably arranged to the door frame 210 via the hinges 220.

Figure 4:
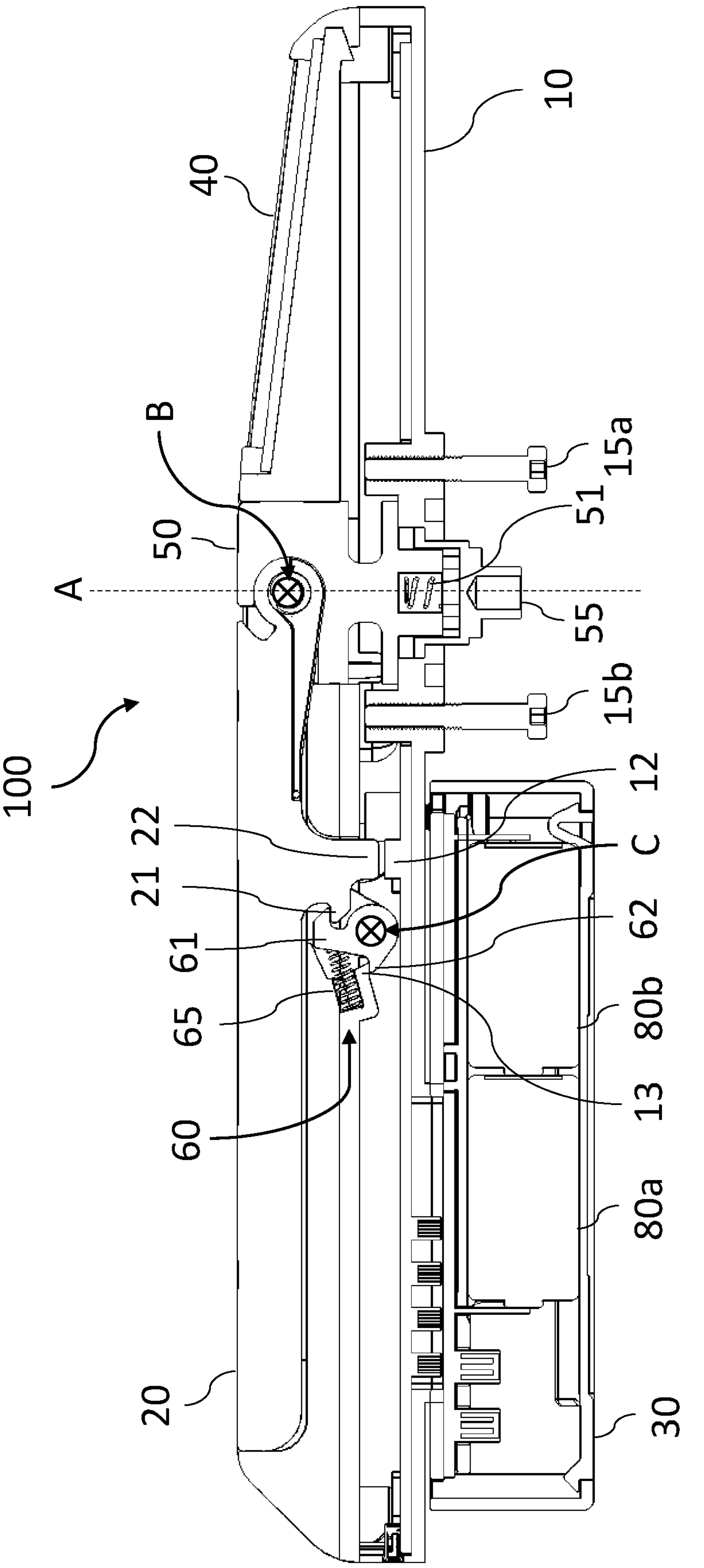
FIG. 4 is a cross sectional side view of a handle arrangement according to one embodiment of the present invention.

In reference to FIG. 4, the first locking mechanism 60 according to one embodiment of the present invention is described in more detail. FIG. 4 illustrate a cross sectional view of the handle arrangement 100 according to one embodiment of the present invention, as seen from the side. The first locking mechanism 60 comprises a handle latch 61 rotatably arranged to the housing 10, which handle latch 61 is rotatable relative the housing 10 about a third rotational axis C between a latching position, in which position the handle latch 61 is configured to engage with a handle latch receiving element 21 of the handle 20, and an unlatched position, in which position the handle latch 61 is configured to be disengaged from the handle 20, such that the handle 20 may freely rotate relative the coupling element 50 and the housing 10.

The handle latch 61 comprises a base portion moveably coupled to the housing, and a latching portion extending out from the base portion, such that a gap is formed in between the base portion, and the latching portion, wherein the latch receiving element 21 is configured to be positioned in said gap when the handle 20 is moved to its secured position. The handle latch 61 further comprises a ridge 62 configured to abut a stopping edge 13 of the housing 10 when the handle latch 61 is rotated to its latching position. The ridge 62 and the stopping edge 13 together prevents the handle latch 61 from being rotated beyond its latching position, in a direction from the unlatched position to the latching position. Thereby, the handle latch 61 is prevented from entering into a position in which it cannot engage with the latch receiving element 21 when the handle 20 is moved to its secured position. The stopping edge 13 is also configured to limit the range of rotation of the handle latch 61 about the third rotational axis C when rotated in the opposite direction, away from the latching position to the unlatched position, by abutting an opposing side of the handle latch 61 relative the engaging side of the handle latch 61. Hence, the full range of rotation of the handle latch 61 is defined by the shape and position of the stopping edge 13, in conjunction with the ridge 62.

The latch receiving element 21 of the handle 20 is provided with an inclined surface facing the housing recess 11 of the housing 10, inclined relative a plane substantially parallel to the back side of the handle 20. This inclined surface allows for the handle 20 to displace the handle latch 61, when in a latching position, slightly, as the handle 20 is moved to its secured position, such that the handle 20 may fully enter a secured position.

Furthermore, the handle latch 61 of the first locking mechanism 60 is provided with an inclined surface substantially facing the handle 20 when in a latching position, the inclined surface inclined with respect to the direction the handle makes contact with the handle latch 61 when said handle latch 61 is in a latching position. If the handle latch 61 is in a latching position, this inclined surface allows for the handle latch 61 to displace itself slightly as the handle 20 is moved to its secured position, such that the handle 20 may fully enter a secured position.

Having these inclined surfaces, the one on the handle latch 61 and the one on the latch receiving element 21, an actuation of displacement of the handle latch 61 is facilitated, such that the handle 20 more easily can be moved into its secured position.

The first locking mechanism 60 also comprises a spring 65. The spring 65 is configured to bias the handle latch 61 toward its latching position. Further, the spring 65 allows for an automatic locking of the handle 20 to the housing 10 when the handle 20 is moved to its secured position, since the handle latch 61 is biased to move to its latching position, such that it engages with the latch receiving element 21. The spring 65 in conjunction with said inclined surface(s) on the handle latch 61 and the latch receiving element 21 of the handle 20, respectively, allow for the handle 20, when pushed to the secured position, to be automatically secured to the housing 10. When the handle 20 is pushed toward the housing 10, the inclined surfaces of the handle latch 61 and the latch receiving element 21 make contact and the handle latch 61 is rotatably displaced as the handle 20 moves into place, upon which the handle latch 61 may engage with the latch receiving element 21 and the biased spring 65 pushes the handle latch 61 to engage with the latch receiving element 21.

The housing 10 of the handle arrangement 100 comprises a stopping portion 12 configured to prevent the handle 20 from moving too deeply into the housing recess 11. If caused to move deeper into the housing recess 11 relative the secured position of the handle 20, the stopping portion 12 abuts the handle 20, thereby preventing it from moving further into the housing recess 11. This hinders the latch receiving element 21 of the handle 20 to accidently cause damage to the first locking mechanism 60.

Furthermore, the handle 20 comprises a heel 22 configured to abut the stopping portion 12 if the handle 20 is moved too deeply into the housing recess 11. The distance the handle 20 can be moved into the housing recess 11 is predetermined by the combined height of the heel 22 and the stopping portion 12, the height being the extension of the heel 22 and the stopping portion 12 combined along the direction of depth of the housing recess 11. The heel 22 and the stopping portion 12 each have a flat surface at their mutual contact interface. This allows for an increased abutting interface area, such that forces resulting by the handle 20 being moved into the housing recess 11 are distributed more preferably. Further, it prevents the first locking mechanism 60 from being exposed to undesired forces by the latch receiving element 21.

One embodiment of the handle arrangement 100 also comprises a handle spring 25 arranged in between the handle 20 and the housing 10. The handle spring 25, which is shown in FIG. 1*b*, is attached at one end to the handle 20, wherein an opposite end is configured to abut the bottom of the housing recess 11 of the housing when the handle 20 is moved to its secured position. The handle spring 25 revolves around an axle by which the handle 20 is arranged to the coupling element 50. The portion of the spring revolving the axle, the revolving portion, may comprise a plurality of spring turns. One end of the handle spring 25 extends out from the revolving portion of the handle spring 25 and is configured to abut the handle 20. The opposite end of the handle spring 25 also extends out from the revolving portion, and being substantially L-shaped. The L-shaped portion of the handle spring 25 is configured to abut the bottom of the housing recess 11 of the housing 10 when the handle 20 is moved to its secured position. When the handle 20 is moved to its secured position, the handle spring 25 abuts the bottom of the housing recess 11 of the housing 10. Due to the opposite handle spring end already being in abutment with the handle, the spring is biased and exerts a force on the handle to move away from the housing recess 11 of the housing 10.

One embodiment of the handle arrangement 100 also comprises a pre-biased coupling element spring 51 arranged in-between the coupling element 50 and the coupling portion 55, such that the coupling element 50 is pushed relative the coupling portion in a direction toward the front side facing direction. The coupling element spring 51 facilitates rotation of the coupling element 50 relative the housing 10 about the first rotational axis A.

Figure 5A:
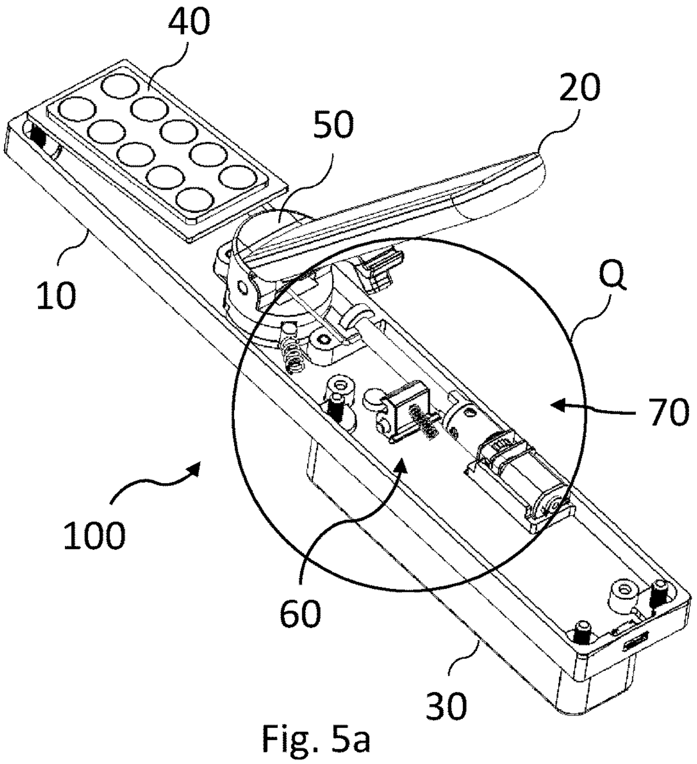
FIGS. 5*a*-5*c* are perspective views of a handle arrangement according to one embodiment of the present invention.
Figure 5B:
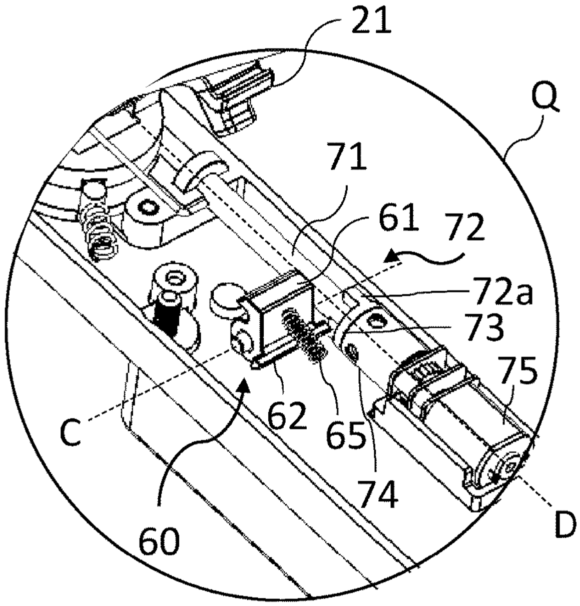
Figure 5C:
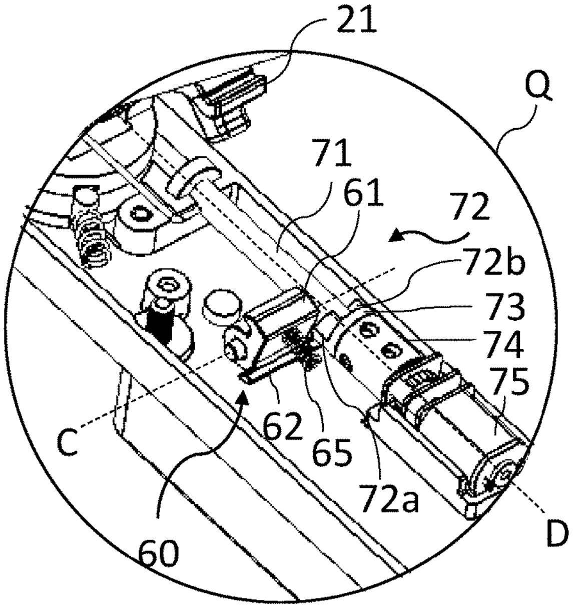

In reference to FIGS. 5*a-c*, the actuating device 70 according to one embodiment of the present invention is described in more detail. In FIG. 5*a*, the handle arrangement 100 is seen when a front portion of the housing 10 has been removed, so as to show a selection of interior components more clearly. Further, the handle arrangement 100 is seen when the handle is in a released state. In FIG. 5*b*, 5*c*, the region of FIG. 5*a* enclosed by the circle Q is shown. In FIG. 5*b*, the handle latch 61 of the first locking mechanism 60 is in a locking position, while in FIG. 5*c*, the handle latch 61 of the first locking mechanism 60 is moved away from the locking position. In FIG. 5*c*, the handle latch 61 has been rotated relative the housing 10 about the third rotational axis C away from its locking position shown in FIG. 5*b*.

The actuating device 70 comprises an actuating member 72. The actuating member 72 is configured to rotate relative the housing 10 about a fourth rotational axis D. The actuating device 70 is arranged in close proximity with the first locking mechanism 60 such that the actuating member 72 may engage with the first locking mechanism 60. The actuating member 72 comprises a first set of actuating portions 72*a*, 72*b* arranged fixedly on the shaft 71 at a radial offset from the shaft 71. When rotating the actuating member 72 relative the housing 10 about the fourth rotational axis D, one of the first set of actuating portions 72*a*, 72*b* is rotated such that it makes contact with the ridge 62 of the handle latch 61 of the first locking mechanism 60, through which contact the handle latch 61 is actuated into a rotation about the third rotational axis C. Hence, via the actuating device 70, the first locking mechanism may be actuated into a locking state, or an unlocking state, such that the handle 20 is secured to, or released from the housing 10, respectively. Further, the actuating member 72 may in one embodiment comprise a shaft 71, as can be seen in FIGS. 5*b*-5*c*.

Further, one actuating portion of the first set of actuating portions 72*a*, 72*b* is configured to, as anyone of them engages with the ridge 62, to push onto the ridge 62 such that the handle latch 61 rotates about the third rotational axis C. As the actuating member 72 continuous to rotate about the fourth rotational axis D, the handle latch 61 is rotated to an unlatched position, in which position the handle may be released from the handle. The actuation device 70 may be configured to automatically stop any further actuation of the first locking mechanism when the first locking mechanism enters this released state. The actuation device 70 may be further operated such that the actuating member 72 rotates further. Consequently, the actuating portion 72*a*, 72*b* is forced to push further onto the ridge 62. However, any further rotation of the handle latch 61 may be prohibited by mutually configure the ridge 62 and the actuating portion 72*a*, 72*b* such that they mutually slip relative each other such that the actuating portion 72*a*, 72*b* moves past the ridge 62 such that no actuating portion 72*a*, 72*b* engages with the ridge 62 of the latch. Due to the spring 65, which is now biased, pushes onto the handle latch 61 and moves it back to its latching position.

The first set of actuating portions 72*a*, 72*b* are mutually arranged on opposite sides of the actuating member 72. This allows for the actuating device 70 to actuate the first locking mechanism 60 twice for every revolution of the actuating member 72.

Further, the first set of actuating portions 72*a*, 72*b* are arranged on a cylindrical base portion 73 of the actuating member 72, to which at least a first actuating portion 72*a*, 72*b* of the first set of actuating portions 72*a*, 72*b* is arranged. The cylindrical base portion 73 is configured to provide support to said actuating portions 72*a*, 72*b*. Further, said actuating portions 72*a*, 72*b* extend along the face of the cylindrical base portion such that their direction of extension is at an angle relative a radial direction from the actuating member 72 pointing to each radial position on the cylindrical base portion 73.

Further, the actuating member 72 comprises a cylinder 74 coaxially arranged with the base portion 73 and rotatable relative the housing about the fourth rotational axis D. The cylinder 74 is configured with a plurality of recesses arranged along the circumferential side of the cylinder 74. The handle arrangement 100 comprises a distance measurement device. The distance measurement device is arranged in the interior of the housing 10. The distance measurement device is configured to measure the distance to the surface of the cylinder. The electronics of the handle arrangement 100 is configured to be able to determine a deviation of the measured distance to the cylinder 74. Such a deviation occurs when the distance measurement device is aimed into a recess of the cylinder 74, consequently leading to the measured distance deviating from the distance measured to the curved cylinder surface. By having multiple recess arranged in specific patterns on the cylinder, the electronics of the handle arrangement 100 is able to determine the rotational orientation of the cylinder, and through it, the rotational orientation of the actuating member 72. Equipped with this information, the electronics may determine how much the actuating member 72 is required to rotate about the fourth rotational axis D in order to have a specific orientation.

Further, the actuating device 70 comprises an electronic motor 75 coaxially arranged relative the actuating member 72 and configured to actuate the rotation of the actuating member 72 about the fourth rotational axis D. The electric motor 75 is coaxially arranged with the cylinder 74.

Figure 6A:
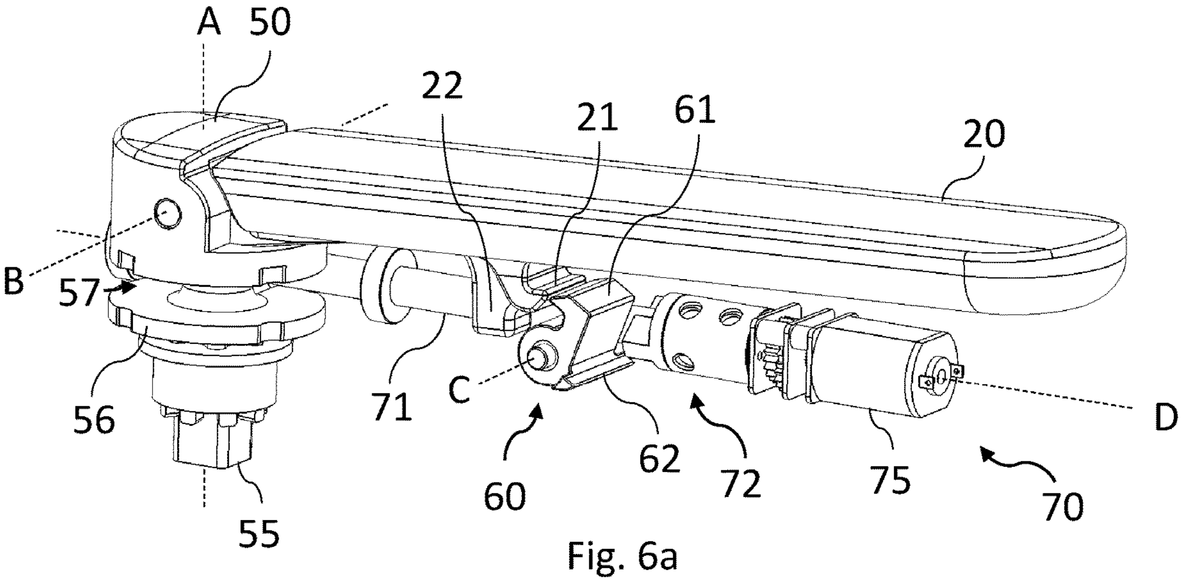
FIGS. 6*a*-6*b* are perspective views of a selection of components of a handle arrangement according to one embodiment of the present invention.
Figure 6B:
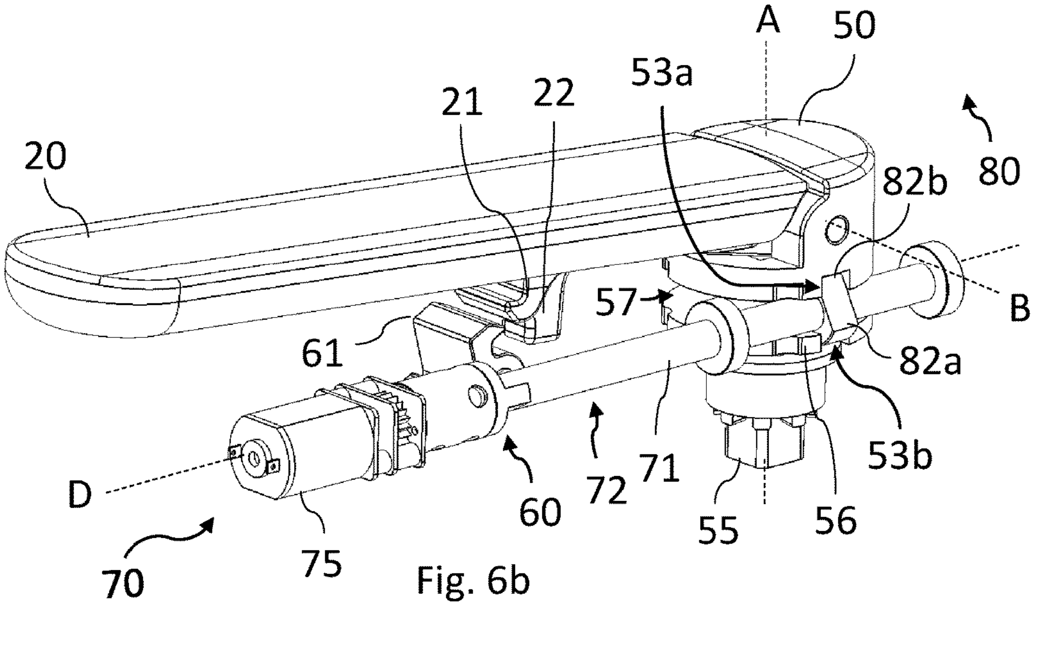

In FIGS. 6*a*, 6*b*, there is illustrated a handle arrangement 100 according to one embodiment of the present invention. The handle arrangement 100 is shown in two different perspective views, in which views only the handle 20, the coupling element 50, the first and second locking mechanism 60, 80, and the actuating device 70 are illustrated as they are assembled in the housing 10.

The second locking mechanism 80 is shown in particular in FIG. 6*b*. The second locking mechanism 80 comprises a set of second actuating portions 82*a*, 82*b* configured to engage with recesses 53*a*, 53*b* provided on the coupling element 50 on opposite sides about a gap 57 extending along the circumferential direction of the coupling element 50 about the first rotational axis A. The second actuating portions 82*a*, 82*b* are arranged on the actuating member 72, on opposing sides of the actuating member 72, and each of said actuating portions 82*a*, 82*b* extend substantially in opposite lateral directions relative the actuating member 72. The second actuating portions 82*a*, 82*b* are substantially similar in shape. The recesses 53*a*, 53*b* are each configured to tightly receive the second actuating portions 82*a*, 82*b*. By rotating the actuating member 72 about the fourth rotational axis D, the second actuating portions 82*a*, 82*b* may be moved into and out of the recesses 53*a*, 53*b*. When the second actuating portions 82*a*, 82*b* are placed in the recesses 53*a*, 53*b*, the handle 20 is prevented from being rotated about the first rotational axis A. When the second actuating portions 82*a*, 82*b* are not placed in the recesses 53*a*, 53*b*, but within the gap 57, the handle 20 is allowed to rotate about the first rotational axis A. The width of the gap 57 is substantially of the same size as the width of said actuating portions 82*a*, 82*b* along a direction parallel to the fourth rotational axis D. The second actuating portions 82*a*, 82*b* may conveniently be rotated about the fourth rotational axis D out of the recesses 53*a*, 53*b* to be placed fully within the gap 57 such that they do not engage with the coupling element 50 via the recesses 53*a*, 53*b*. Hence, when the second locking mechanism 80 is in a locking state, the second actuating portions 82*a*, 82*b* engages with the recesses 53*a*, 53*b*, and when the second locking mechanism 80 is in a releasing state, said second actuating portions 82*a*, 82*b* have each been moved out of the recesses 53*a*, 53*b*. By rotating the actuating member 72 substantially 90 degrees, the second actuating portions 82*a*, 82*b* may be moved from the gap 57 into the recesses 53*a*, 53*b*, or vice versa. Hence, in one embodiment, both the first and second locking mechanism 60, 80 are coupled to the actuating member 72. By rotating the actuating member 72 about the fourth rotational axis D, both the first and the second locking mechanisms 60, 80 are actuated simultaneously. The first actuating portions 72*a*, 72*b* and the second actuating portions 82*a*, 82*b* may be mutually arranged on the actuating member 72 such that the first and second locking mechanism 60, 80 are put in corresponding releasing states at different rotational orientations of the actuating member 72. As an example, assuming a situation where both the first and second locking mechanisms 60, 80 are each in their respective locking states, the actuating device 70 is controlled such that the actuating member 72 rotates about the fourth rotational axis D and actuates the first locking mechanism 60 into a releasing state before the second locking mechanism 80 enters its corresponding releasing state.

Figure 7A:
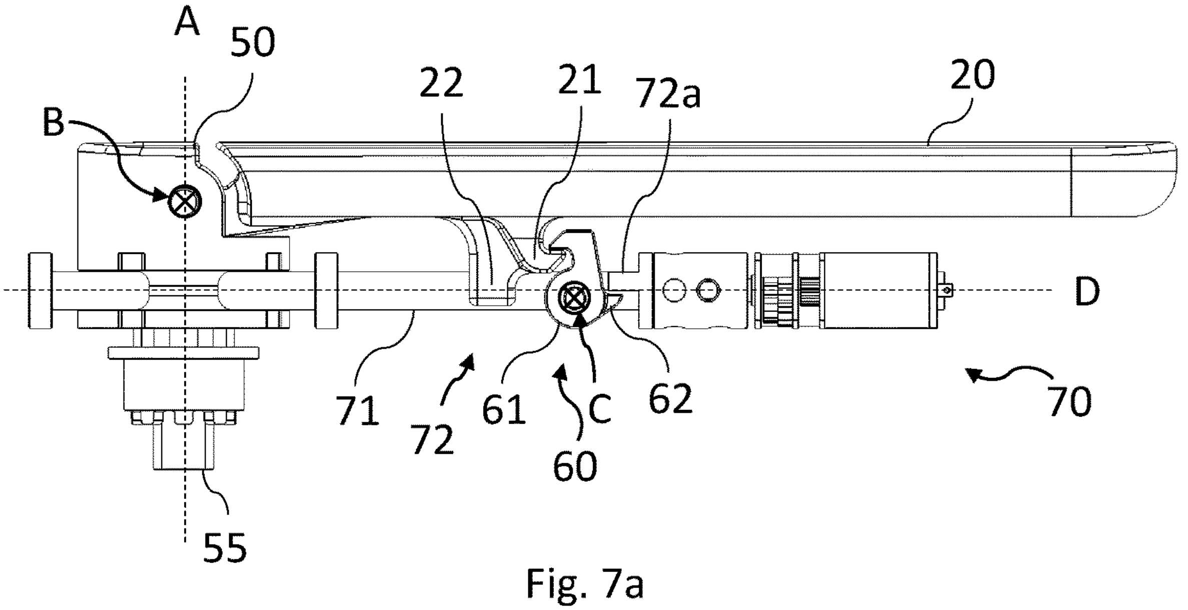
FIGS. 7*a*-7*b* are side views of a selection of components of a handle arrangement according to one embodiment of the present invention.
Figure 7B:
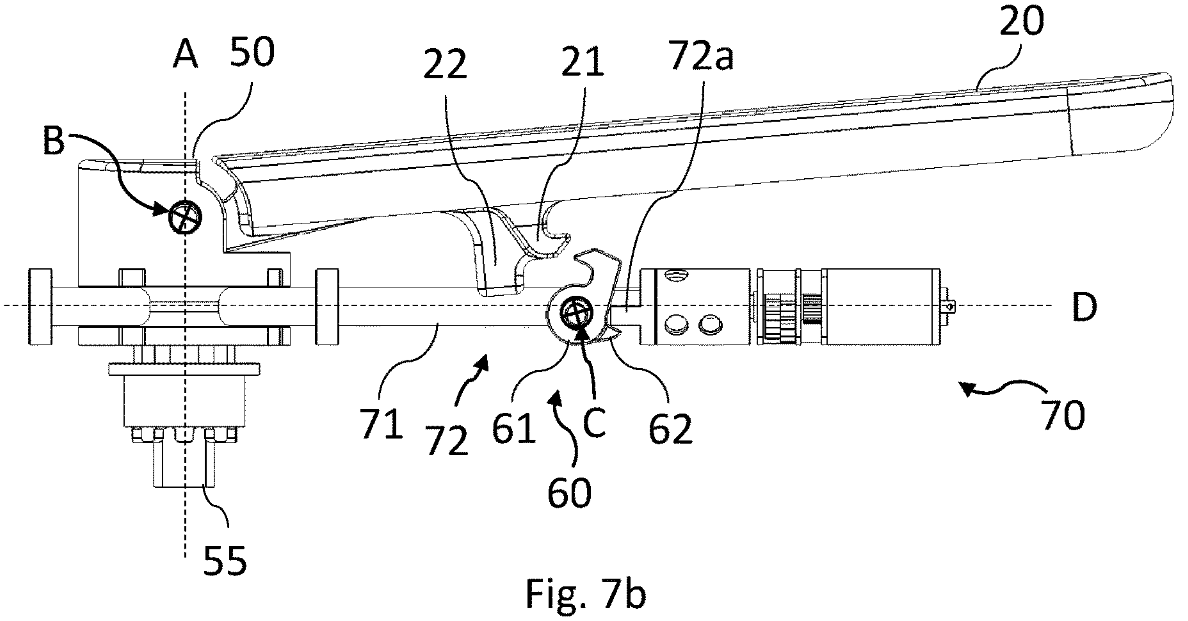

In FIGS. 7*a*, 7*b*, the set of components illustrated in FIGS. 6*a*, 6*b*, are shown as viewed from the side. FIG. 7*a* illustrate the set of components when the handle 10 is in a secured position. FIG. 7*b* illustrate the set of components when the handle 10 has been released from the first locking mechanism 60 and has been displaced slightly from its secured position. FIGS. 7*a*, 7*b* illustrate from another perspective how the actuating member 72, by rotation about the fourth rotational axis D, makes contact with the ridge 62 of the handle latch 61 via the actuating portion 72*a*. The handle latch 61 consequently rotates about the third rotational axis C which moves the handle latch 61 away from the handle latch receiving element 21 of the handle 20, thereby allowing the handle 20 to rotate about the second rotational axis B away from the secured position to the released position, in which position the handle 20 is rotatable about the first rotational axis A.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. Handle arrangement for arrangement to a door provided with a door latch which in a latching position engages with a door frame to prevent the door from being opened, the handle arrangement comprising a housing having a hollow interior;

a handle moveable relative to the housing along a first rotational direction, the handle configured to couple, when the handle arrangement is in use, to the door latch, wherein a movement of the handle along said first rotational direction moves the door latch to or from the latching position by rotating a coupling element coupled to the handle and configured to be coupled to the door latch;

wherein the handle is moveable relative the housing along a second rotational direction, between a secured position, in which position the handle is locked to the housing, and a released position, in which position the handle is moveable relative the housing along the first rotational direction;

characterized in that the handle arrangement further comprises a first locking mechanism configured to, in a locking state, lock the handle in the secured position, and in a releasing state, allow the handle to be moved to the released position, a second locking mechanism configured to, in a locking state, prevent movement of the door latch from the latching position by rotation of the handle along the first rotational direction by engagement of the second locking mechanism with the coupling element, and in a releasing state allow movement of the handle along the first rotational direction to, when in use, move the door latch to or from the latching position; and an actuating device configured to actuate the first locking mechanism into a locking state or a releasing state, wherein the actuating device is further configured to actuate the second locking mechanism into a locking state or a releasing state.

2. Handle arrangement according to claim 1, wherein the first locking mechanism comprises a handle latch moveable relative to the housing between a latching position, in which position the handle latch engages with a latch receiving element of the handle so as to lock the handle in its secured position, and an unlatched position, in which position the handle latch is released from the handle, wherein movement of the handle latch is actuated by the actuating device.

3. Handle arrangement according to claim 2, wherein the handle latch comprises a base portion moveably coupled to the housing, and a latching portion extending out from the base portion, such that a gap is formed in between the base portion, and the latching portion, wherein the latch receiving element of the handle is configured to be positioned in said gap when the handle is moved to its secured position.

4. Handle arrangement according to claim 2, wherein the first locking mechanism comprises a spring configured to bias the handle latch toward the latching position.

5. Handle arrangement according to claim 2, wherein a surface of the handle latch facing the handle is inclined relative the direction in which the handle moves when moved toward the secured position.

6. Handle arrangement according to claim 2, wherein the handle latch comprises a ridge configured to abut a stopping edge of the housing whenever the handle latch is in the latching position.

7. Handle arrangement according to claim 6, wherein the ridge of the handle latch extends further along an axis of rotation of the handle latch than a base portion of the handle latch.

8. Handle arrangement according to claim 2, wherein the handle latch is configured to move rotatably relative the housing between the latching position and the unlatched position.

9. Handle arrangement according to claim 1, wherein the actuating device comprises an actuating member rotatably arranged to the housing to rotate about a rotational axis, the actuating member configured to rotatably engage with at least one of the first and second locking mechanisms to actuate said at least one of the first and second locking mechanisms into a locking state or a releasing state.

10. Handle arrangement according to claim 9, wherein the actuating member comprises an actuating portion extending radially from the rotational axis of the actuating member, wherein the actuating portion is configured to actuate the first locking mechanism.

11. Handle arrangement according to claim 10, wherein the actuating member comprises a first set of two actuating portions arranged on opposing sides about the rotational axis of the actuating member.

12. Handle arrangement according to claim 10, wherein said actuating portion is a first actuating portion and the actuating member further comprises a second actuating portion arranged on the actuating member, the second actuating portion being configured to rotatably actuate the second locking mechanism.

13. Handle arrangement according to claim 9, wherein the actuating device comprises an electric motor coupled to the actuating member.

14. Handle arrangement according to claim 13, wherein the handle arrangement comprises a control panel communicatively connected to the electric motor, which control panel is configured to control the electric motor.

15. Handle arrangement according to claim 1, wherein the actuating device is configured to actuate the first and the second locking mechanisms simultaneously.

* * * * *